United States Patent
Briant et al.

(10) Patent No.: US 10,104,760 B1
(45) Date of Patent: Oct. 16, 2018

(54) PLUGGABLE MODULE HAVING COOLING CHANNEL WITH HEAT TRANSFER FINS

(71) Applicant: TE CONNECTIVITY CORPORATION, Berwyn, PA (US)

(72) Inventors: Eric David Briant, Dillsburg, PA (US); Michael John Phillips, Camp Hill, PA (US); Michael Joseph Tryson, Hanover, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/620,195

(22) Filed: Jun. 12, 2017

(51) Int. Cl.
*H01R 13/648* (2006.01)
*H05K 1/02* (2006.01)
*H01R 13/66* (2006.01)
*H01R 13/6581* (2011.01)

(52) U.S. Cl.
CPC ....... *H05K 1/0203* (2013.01); *H01R 13/6581* (2013.01); *H01R 13/6691* (2013.01)

(58) Field of Classification Search
CPC .......................... H01R 13/6586; H01R 13/6594
USPC .............. 439/607.4, 607.23, 607.28, 607.35, 439/607.21
See application file for complete search history.

(56) References Cited

U.S. PATENT DOCUMENTS

| | | | |
|---|---|---|---|
| 6,816,376 B2 | 11/2004 | Bright et al. | |
| 7,625,223 B1 | 12/2009 | Fogg | |
| 8,083,547 B2 * | 12/2011 | Roth | G02B 6/3817 439/607.1 |
| 9,389,368 B1 * | 7/2016 | Sharf | H01R 27/00 |
| 9,391,407 B1 * | 7/2016 | Bucher | H01R 13/659 |
| 9,509,102 B2 * | 11/2016 | Sharf | H01R 13/665 |
| 9,935,403 B1 | 4/2018 | Briant et al. | |
| 2012/0250735 A1 * | 10/2012 | Tang | G06F 13/409 375/219 |

* cited by examiner

*Primary Examiner* — Phuong Dinh (57) ABSTRACT

A pluggable module includes a pluggable body extending between a front end and a mating end receivable in a module cavity of a receptacle assembly to mate with a communication connector. The pluggable body has channel walls defining a cooling channel at a top of the pluggable body allowing airflow between the front end and the mating end. The pluggable body has a plurality of heat transfer fins in the cooling channel between the channel walls and a landing cover spanning between the channel walls over the heat transfer fins. The channel walls, the heat transfer fins and the landing cover are an integral unitary structure.

22 Claims, 4 Drawing Sheets

PLUGGABLE MODULE HAVING COOLING CHANNEL WITH HEAT TRANSFER FINS

BACKGROUND OF THE INVENTION

The subject matter herein relates generally to pluggable modules having efficient cooling capabilities.

At least some known communication systems include receptacle assemblies, such as input/output (I/O) connector assemblies, that are configured to receive a pluggable module and establish a communicative connection between the pluggable module and an electrical communication connector of the receptacle assembly. As one example, a known receptacle assembly includes a cage member that is mounted to a circuit board and configured to receive a pluggable transceiver in an elongated cavity of the cage member. The pluggable module and the electrical connector have respective electrical contacts that engage one another to establish a communicative connection.

Electrical shielding of the components of the communication system is typically achieved using a receptacle housing or cage that provides shielding around the module cavity that receives the pluggable module. Gaskets are provided in the opening to interface with the pluggable module. However, as data speeds through the communication system increase, heat generated by the components is likewise increased. Heat dissipation from the components is problematic. Some known communication systems provide airflow channels along the pluggable module to provide cooling for the pluggable module, the communication connector or other components of the system. However, the airflow channels define large openings, which is problematic for EMI containment.

Accordingly, there is a need for a communication system having receptacle assemblies and pluggable modules having sufficient EMI containment while providing efficient cooling.

BRIEF DESCRIPTION OF THE INVENTION

In one embodiment, a pluggable module is provided including a pluggable body extending between a front end and a mating end receivable in a module cavity of a receptacle assembly to mate with a communication connector. The pluggable body has channel walls defining a cooling channel at a top of the pluggable body allowing airflow between the front end and the mating end. The pluggable body has a plurality of heat transfer fins in the cooling channel between the channel walls and a landing cover spanning between the channel walls over the heat transfer fins. The channel walls, the heat transfer fins and the landing cover are an integral unitary structure. A communication circuit board is held in the pluggable body and exposed at the mating end. The pluggable body is configured to be plugged into the receptacle assembly such that the communication circuit board is communicatively coupled to the communication connector of the receptacle assembly.

In another embodiment, a pluggable module is provided including a pluggable body having an upper shell and a lower shell. The lower shell has a lower wall and lower side walls and the upper shell having an upper wall and upper side walls forming a cavity. The pluggable body extends between a front end and a mating end receivable in a module cavity of a receptacle assembly to mate with a communication connector. The upper wall has a cooling channel allowing airflow between the front end and the mating end and a plurality of heat transfer fins in the cooling channel. The upper wall has a landing cover at a top of the upper shell spanning over the heat transfer fins. The upper shell has a heat spreader plate at the upper wall between the upper side walls that closes the cooling channel below the heat transfer fins. A communication circuit board is held in the pluggable body and is exposed at the mating end. The communication circuit board has a communication component in thermal contact with the heat spreader plate. The pluggable body is configured to be plugged into the receptacle assembly such that the communication circuit board is communicatively coupled to the communication connector of the receptacle assembly.

In a further embodiment, a pluggable module is provided including a pluggable body having an upper shell and a lower shell. The lower shell has a lower wall and lower side walls and the upper shell has an upper wall and upper side walls forming a cavity. The pluggable body extends between a front end and a mating end receivable in a module cavity of a receptacle assembly to mate with a communication connector. The upper wall has a cooling channel allowing airflow between the front end and the mating end and a plurality of heat transfer fins in the cooling channel extending longitudinally between front ends and rear ends. The upper wall has a landing cover at a top of the upper wall spanning over the front ends of the heat transfer fins. The upper shell has a heat spreader plate at a bottom of the upper wall spanning below the rear ends of the heat transfer fins. The landing cover and the heat spreader plate are longitudinally offset. A communication circuit board is held in the pluggable body and is exposed at the mating end. The communication circuit board has a communication component in thermal contact with the heat spreader plate. The pluggable body is configured to be plugged into the receptacle assembly such that the communication circuit board is communicatively coupled to the communication connector of the receptacle assembly.

DETAILED DESCRIPTION OF THE INVENTION

Figure 1:
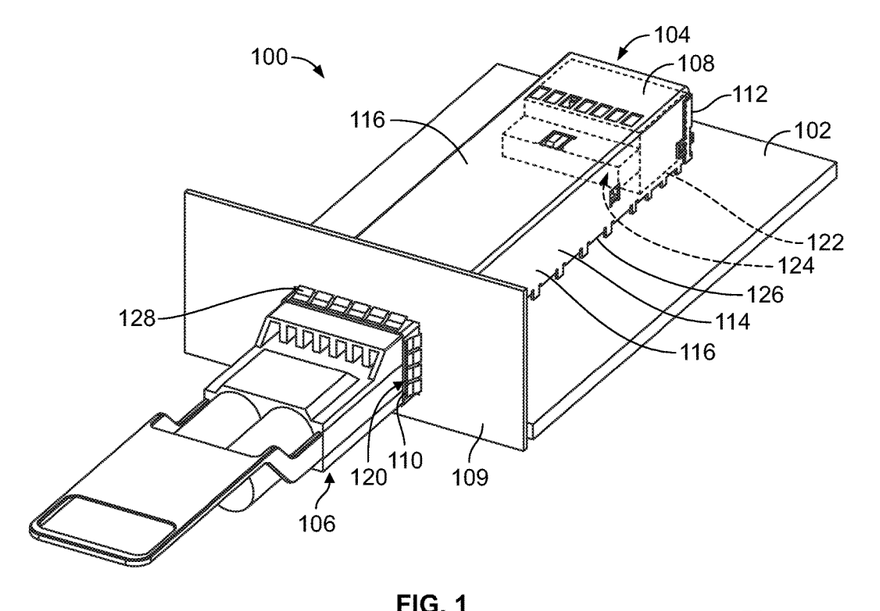
FIG. 1 is a front perspective view of a communication system in accordance with an embodiment.

FIG. 1 is a front perspective view of a communication system 100 in accordance with an embodiment. The communication system 100 includes a circuit board 102, a receptacle assembly 104 mounted to the circuit board 102, and a pluggable module 106 that is configured to be received in the receptacle assembly 104. The circuit board 102 may be a daughter card or a mother board and include conductive traces (not shown) extending therethrough. Optionally, the pluggable module 106 may be communicatively coupled to the receptacle assembly 104, such as to a communication connector, to send and/or receive data signals with components of the communication system 100.

The communication system 100 may be part of or used with telecommunication systems or devices. For example, the communication system 100 may be part of or include a switch, router, server, hub, network interface card, or storage system. In the illustrated embodiment, the pluggable module 106 is configured to transmit data signals in the form of electrical signals. In other embodiments, the pluggable module 106 may be configured to transmit data signals in the form of optical signals. The circuit board 102 may be a daughter card or a mother board and include conductive traces (not shown) extending therethrough.

In the illustrated embodiment, the receptacle assembly 104 is illustrated as a single port receptacle assembly configured to receive a single pluggable module 106; however, the receptacle assembly 104 may be a multi-port receptacle assembly in other embodiments configured to receive pluggable modules 106 in multiple ports. For example, the multiple ports of the receptacle assembly 104 may be ganged side-by-side and/or stacked in addition to, or alternative to, ganged ports.

The pluggable module 106 is an input/output (I/O) module configured to be inserted into and removed from the receptacle assembly 104. For example, the pluggable module 106 may be a small form-factor pluggable (SFP) transceiver or quad small form-factor pluggable (QSFP) transceiver, such as those satisfying certain technical specifications for SFP or QSFP transceivers, such as Small-Form Factor (SFF)-8431. By way of example, the pluggable module 106 may be used in place of transceivers which are part of the SFP+ product family available from TE Connectivity.

The receptacle assembly 104 includes a cage member 108 that is mounted to the circuit board 102. The cage member 108 may be arranged at a bezel or panel 109 of a chassis of the system or device, such as through an opening in the panel 109. As such, the cage member 108 is interior of the device and corresponding panel 109 and the pluggable module(s) 106 is loaded into the cage member 108 from outside or exterior of the device and corresponding panel 109. Optionally, the panel 109 may include a plurality of openings each configured to receive a corresponding pluggable module 106. In other various embodiments, the opening in the panel 109 may be sized to receive multiple pluggable modules 106, such as when a multi-port receptacle assembly 104 is used.

The cage member 108 includes a front end 110 and an opposite rear end 112. The front end 110 may be provided at, and extend through an opening in, the panel 109. Relative or spatial terms such as "front," "rear," "top," or "bottom" are only used to distinguish the referenced elements and do not necessarily require particular positions or orientations in the communication system 100 or in the surrounding environment of the communication system 100. For example, the front end 110 may be located in or facing a back portion of a larger telecommunication system. In many applications, the front end 110 is viewable to a user when the user is inserting the pluggable module 106 into the receptacle assembly 104. The pluggable module 106 is accessible to the user and viewable to the user when the pluggable module 106 is inserted into the receptacle assembly 104.

The cage member 108 is configured to contain or block interference, such as electromagnetic interference (EMI), and guide the pluggable module(s) 106 during a mating operation. To this end, the cage member 108 includes multiple pieces assembled together to enclose the pluggable module 106. For example, the pieces may be snap-fit together and/or welded together. When the cage member 108 is mounted to the circuit board 102, the cage member 108 is electrically coupled to the circuit board 102 and, in particular, to ground planes (not shown) within the circuit board 102 to electrically ground the cage member 108. As such, the receptacle assembly 104 may reduce EMI that may negatively affect electrical performance of the communication system 100. The pluggable module 106 may be electrically commoned with or grounded to the cage member 108, such as for EMI containment and/or shielding. For example, the pluggable module 106 may directly engage a portion of the cage member 108, such as an EMI gasket at the opening to the cage member 108.

In an exemplary embodiment, the cage member 108 includes a receptacle housing 114 defined by a plurality of housing panels or walls 116, which may be formed from one or more pieces. The various walls 116 provide shielding for vulnerable areas of other components, such as by covering or shielding openings in walls of the other components. The receptacle housing 114 extends between the front end 110 and the rear end 112. The walls 116 are formed from conductive material, such as sheet metal and/or a polymer having conductive particles. In the illustrated embodiment, the pieces are stamped and formed from sheet metal. In some embodiments, the cage member 108 is configured to facilitate airflow through the cage member 108 to transfer heat (or thermal energy) away from the receptacle assembly 104 and the pluggable module(s) 106. The air may flow from inside the cage member 108 (for example, behind the panel 109) to the external environment (for example, forward of the panel 109) or from outside the cage member 108 into the interior of the cage member 108. Fans or other air moving devices may be used to increase airflow through the cage member 108 and over the pluggable module(s) 106.

The receptacle housing 114 defines a module cavity 120 extending between the front and rear ends 110, 112. The module cavity 120 receives the pluggable module 106. The module cavity 120 extends lengthwise in a direction that is parallel to the plugging axis of the pluggable module 106. For a multi-port receptacle assembly 104, multiple module cavities 120 or ports are defined for receiving multiple pluggable modules 106. In such embodiments, the module cavities 120 may be stacked vertically and/or ganged horizontally. Separator panels may be provided between the module cavities 120 to provide shielding between the module cavities 120.

The receptacle assembly 104 includes a communication connector 122 (shown in phantom in FIG. 1) having a mating interface 124 for mating with the pluggable module 106. The communication connector 122 may have multiple mating interfaces when configured to mate with multiple pluggable modules 106, such as when used in a stacked cage member. The communication connector 122 is disposed at the rear end of the module cavity 120. In an exemplary embodiment, the communication connector 122 is provided at or near the rear end 112 of the cage member 108. The communication connector 122 includes electrical contacts (not shown) that are configured to be mated with the pluggable module 106. The communication connector 122 is configured to be mounted to the circuit board 102. The communication connector 122 is configured to be received in the cage member 108 through a bottom 126 of the cage member 108. For example, the cage member 108 is configured to be mounted to the circuit board 102 over the communication connector 122 such that the communication connector 122 passes through an opening in the bottom 126 as the cage member 108 is mounted to the circuit board 102.

In an exemplary embodiment, the receptacle assembly 104 includes an EMI gasket 128 at the front end 110 of the receptacle housing 114. The EMI gasket 128 interfaces with the panel 109, such as within the opening in the panel 109 that receives the receptacle assembly 104. The EMI gasket 128 may be one or more separate pieces, which may be attached to the receptacle housing 114, such as by clipping onto the receptacle housing 114, welding to the receptacle housing 114 or otherwise being secured to the receptacle housing 114. In other various embodiments, the EMI gasket 128 may be integral with the receptacle housing 114, such as being stamped and formed out of or extending from the walls 116 of the receptacle housing 114. The EMI gasket 128 may extend into the module cavity 120 to engage the pluggable module 106.

Figure 2:
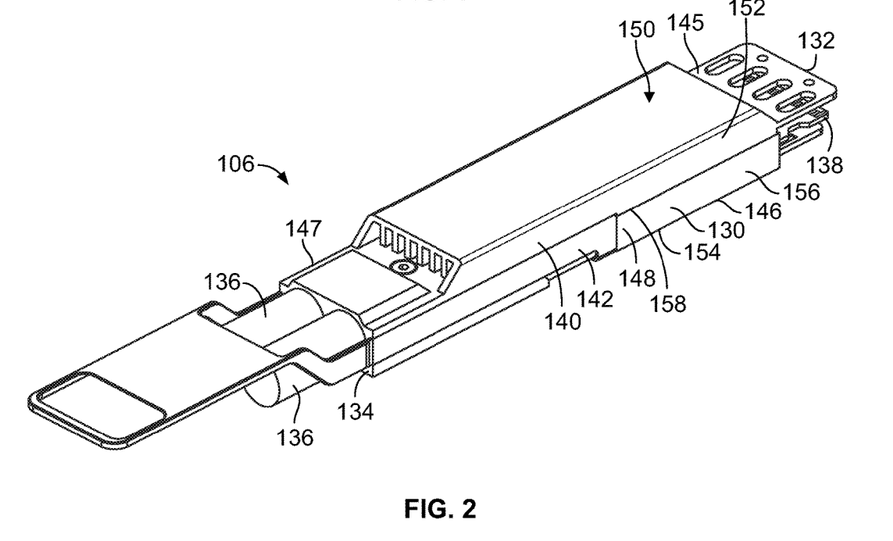
FIG. 2 is a front perspective view of a pluggable module of the communication system in accordance with an exemplary embodiment.
Figure 3:
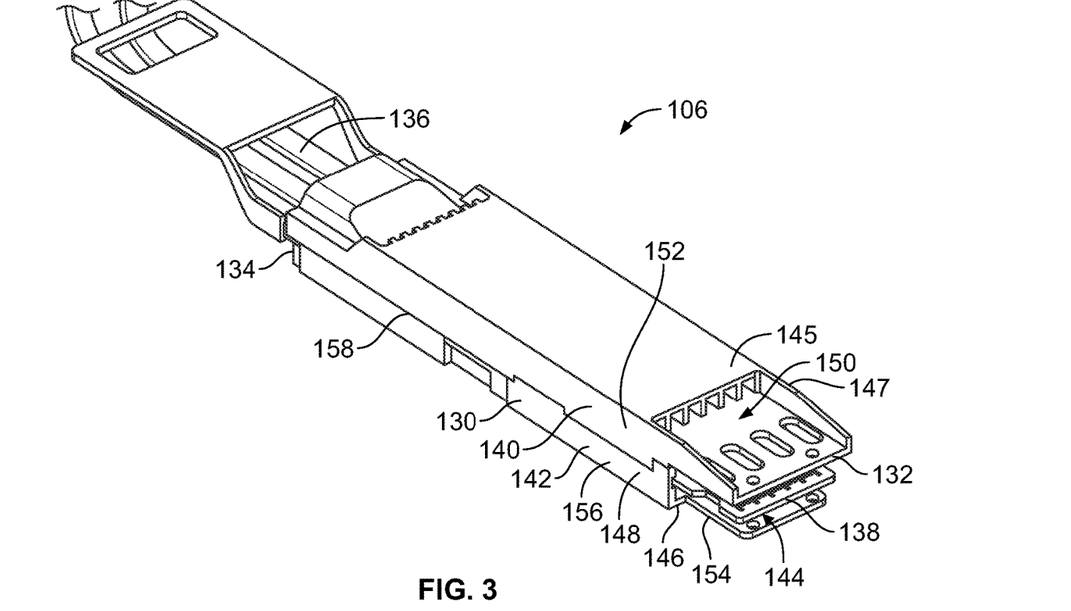
FIG. 3 is a rear perspective view of the pluggable module in accordance with an exemplary embodiment.

FIG. 2 is a front perspective view of the pluggable module 106 in accordance with an exemplary embodiment. FIG. 3 is a rear perspective view of the pluggable module 106 in accordance with an exemplary embodiment. The pluggable module 106 has a pluggable body 130, which may be defined by one or more shells. For example, in the illustrated embodiment, the pluggable body 130 includes an upper shell 140 and a lower shell 142. The pluggable body 130 may be thermally conductive and/or may be electrically conductive, such as to provide EMI shielding for the pluggable module 106. The pluggable body 130 includes a rear end or mating end 132 and an opposite front end 134. The mating end 132 is configured to be inserted into the module cavity 120 (shown in FIG. 1) for mating with the communication connector 122 (shown in FIG. 1). The front end 134 is typically a cable end having one or more cables 136 extending to another component within the system. The front end 134 is exposed forward of the panel 109 from the exterior of the receptacle assembly 104.

The pluggable body 130 includes a communication circuit board 138 held within the pluggable body 130, such as in a cavity 144 defined by the upper and lower shells 140, 142. The communication circuit board 138 is configured to be communicatively coupled to the communication connector 122 (shown in FIG. 1). The communication circuit board 138 may be accessible or exposed at the mating end 132. The cables 136 are terminated to the communication circuit board 138, such as directly or through a connector on the communication circuit board 138. The cables 136 may be copper wires transmitting electrical signals or may be fiber optic cables transmitting optical signals. The communication circuit board 138 has communication components (not shown) connected thereto for transmitting the signals between the cables 136 and the mating end of the communication circuit board 138. For example, the communication circuit board 138 may have conductors, traces, pads, electronics, optical modules, sensors, controllers, switches, inputs, outputs, and the like associated with the communication circuit board 138, which may be mounted to the communication circuit board 138, to form circuits and to control operation of the pluggable module 106.

The pluggable module 106 includes an outer perimeter defining an exterior of the pluggable body 130. The exterior extends between the mating end 132 and the front end 134 of the pluggable module 106. The exterior is defined by one or more surfaces of the pluggable body 130. For example, the exterior may be defined by a top 145, a bottom 146 and opposite first and second sides 147, 148 of the pluggable body 130.

In an exemplary embodiment, the pluggable body 130 provides heat transfer for the communication circuit board 138, such as for the electronic components on the communication circuit board 138. For example, the communication circuit board 138 is in thermal communication with the pluggable body 130 and the pluggable body 130 transfers heat from the communication circuit board 138.

The upper and lower shells 140, 142 are coupled together to form the pluggable body 130. The upper shell 140 has an upper wall 150 and upper side walls 152 and the lower shell 142 has a lower wall 154 and lower side walls 156. The lower wall 154, the upper wall 150, the lower side walls 156 and the upper side walls 152 form the cavity 144. The side walls 152, 156 may be coupled together to form the pluggable body 130. For example, the side walls 152, 156 may meet at a seam 158 around the exterior. The side walls 152, 156 may have similar heights such that the seam 158 is approximately centered between the top 145 and the bottom 146. In an exemplary embodiment, the upper shell 140 and the lower shell 142 are die cast components manufactured from metal materials using dies or tools to cast the parts; however, the shells 140, 142 may be manufactured by other processes in alternative embodiments, such as molding, milling, machining, extruding, stamping, forming, and the like.

Figure 4:
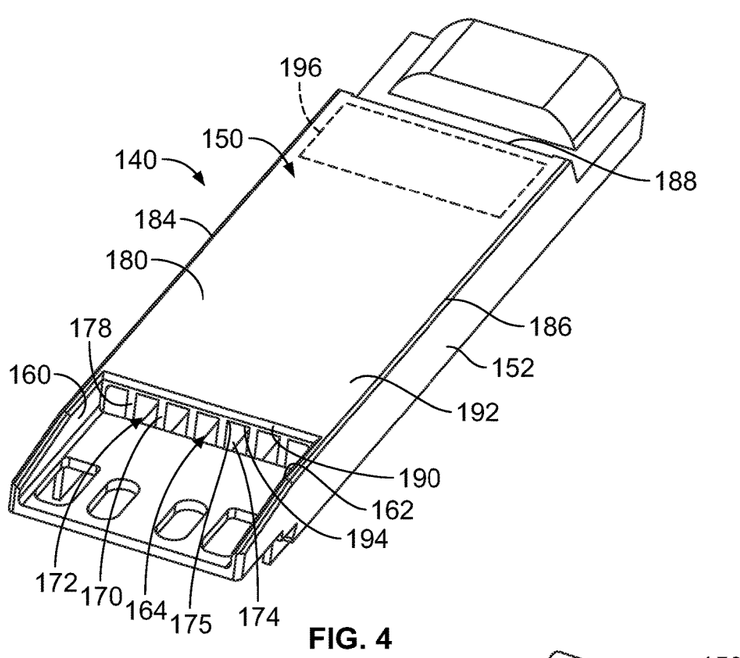
FIG. 4 is a top perspective view of an upper shell of a pluggable body of the pluggable module in accordance with an exemplary embodiment.
Figure 5:
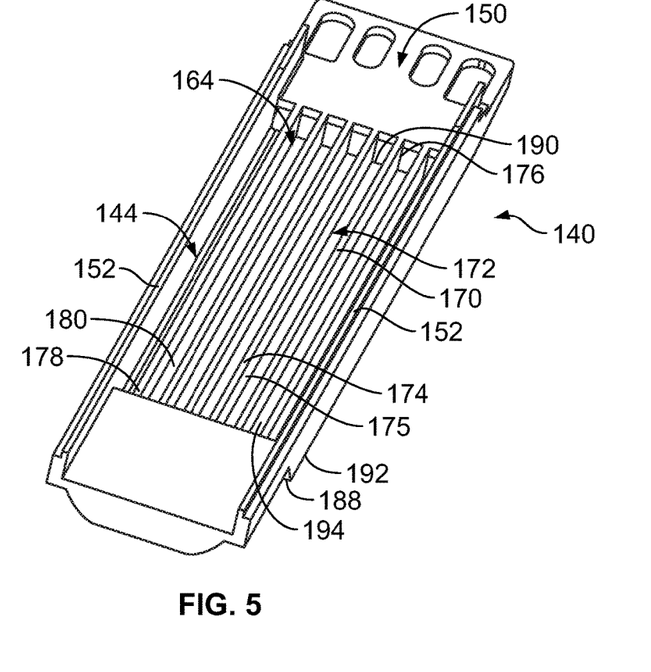
FIG. 5 is a bottom perspective view of the upper shell in accordance with an exemplary embodiment.

FIG. 4 is a top perspective view of a portion of the pluggable body 130 showing the upper shell 140 in accordance with an exemplary embodiment. FIG. 5 is a bottom perspective view of a portion of the pluggable body 130 showing the upper shell 140 in accordance with an exemplary embodiment. In an exemplary embodiment, the upper shell 140 is an integral unitary structure. For example, as noted above, the upper shell 140 may be a die cast structure where the portions, walls, and features are integral with each other to form a unitary one-piece body. As such, the portions, walls, and features do not include thermal interfaces therebetween, but rather the entire, one piece structure of the upper shell 140 may be used to dissipate heat from the communication components and do not require assembly.

The upper wall 150 has channel walls 160, 162 at opposite sides that define a cooling channel 164 at the top 145 of the upper shell 140. The cooling channel 164 allows airflow between the front end 134 and the mating end 132. The airflow may be used to cool the upper shell 140, components held within the pluggable body 130, such as the communication components of the communication circuit board 138, and/or to cool other components, such as the communication connector 122 or other components within the system 100. The air may flow from front-to-back or from back-to-front within the cooling channel 164.

The channel walls 160, 162 may be planar and may be parallel to each other. The channel walls 160, 162 may be aligned above and may be continuous extensions of the side walls 152 of the upper shell 140. The channel walls 160, 162 may extend any length between the front end 134 and the mating end 132, such as substantially the entire length, as in the illustrated embedment. The channel walls 160, 162 may have angled ends defining lead-in surfaces to guide loading of the pluggable module 106 into the module cavity 120.

In an exemplary embodiment, the channel walls 160, 162 are provided at the opposite sides of the upper shell 140 such that the cooling channel 164 spans the entire width of the upper shell 140 between the channel walls 160, 162. The cooling channel 164 is open near the front end 134 (for example, between the channel walls 160, 162) and near the mating end 132 (for example, between the channel walls 160, 162) to allow airflow through the pluggable module 106. In other various embodiments, the channel walls 160, 162 may be at other locations.

The upper wall 150 includes a plurality of heat transfer fins 170 along at least a portion of the upper wall 150. The heat transfer fins 170 are positioned between the channel walls 160, 162 and optionally extend parallel to the channel walls 160, 162 longitudinally between the front end 134 and the mating end 132. Optionally, the channel walls 160, 162 are at least one of thicker and taller as compared to the heat transfer fins 170. The heat transfer fins 170 sub-divide the cooling channel 164 into cooling sub-channels. The heat transfer fins 170 transfer heat away from the interior of the pluggable body 130, and thus from the communication circuit board 138 and associated components. The heat transfer fins 170 are separated by gaps 172 that allow airflow or other cooling flow along the surfaces of the heat transfer fins 170 to dissipate the heat therefrom. The heat transfer fins 170 extend from bases 174 to tips 175. In the illustrated embodiment, the bases 174 are uncovered and the tips 175 are covered; however, at least portions of the bases 174 may be covered in alternative embodiments and/or at least portions of the tips 175 may be uncovered in alternative embodiments.

In the illustrated embodiment, the heat transfer fins 170 are parallel plates that extend lengthwise; however the heat transfer fins 170 may have other shapes in alternative embodiments, such as cylindrical or other shaped posts. In an exemplary embodiment, the heat transfer fins 170 extend between front ends 176 and rear ends 178, which may be recessed from the front end 134 and the mating end 132, respectively. Optionally, the channel walls 160, 162 may be longer than the heat transfer fins 170. Optionally, the cooling channel 164 may be open below the heat transfer fins 170, such as to allow airflow into the interior of the upper shell 140 and/or for forming the heat transfer fins 170 using the forming die during manufacture.

The upper wall 150 includes a landing cover 180 spanning the channel walls 160, 162 over the heat transfer fins 170. The landing cover 180 provides a lid for the cooling channel 164. The landing cover 180 extends along the tips 175 of the heat transfer fins 170. In an exemplary embodiment, the landing cover 180 provides EMI shielding through the cooling channel 164, such as at the panel 109 (shown in FIG. 1). For example, the landing cover 180 may engage the EMI spring beams of the EMI gasket 128 (shown in FIG. 1) where the pluggable module 106 enters/exits the receptacle cage 108. The area of the gaps 172 defined between the heat transfer fins 170 and capped by the landing cover 180 may be appropriately sized for EMI containment.

In an exemplary embodiment, the landing cover 180 is part of the integral unitary structure of the upper shell 140. For example, the landing cover 180 is integral with the heat transfer fins 170, the channel walls 160, 162, as well as other portions of the upper wall 150. The integral unitary structure is devoid of separate thermal interfaces between the heat transfer fins 170 and the landing cover 180 and between the channel walls 160, 162 and the landing cover 180. The structure transitions between the landing cover 180 and the heat transfer fins 170 and channel walls 160, 162 without disparate thermal interfaces. Being integral, the landing cover 180 is electrically commoned with the other parts of the upper shell 140. Fewer components are needed to be assembled when using the integral landing cover 180 with the heat transfer fins 170. Providing the landing cover 180 above the heat transfer fins 170 provides a flat surface for interfacing with other components, such as the EMI gasket and/or a heat sink of the receptacle assembly 104.

The landing cover 180 extends between opposite sides 184, 186 at the channel walls 160, 162 and opposite front and rear ends 188, 190. The landing cover 180 has a top 192 and a bottom 194. In an exemplary embodiment, the top 192 is flat and planar defining the top 145 of the pluggable module 130. The bottom 194 faces the cooling channel 164.

In an exemplary embodiment, the landing cover 180 includes a planar landing surface defining a gasket interface 196 at the top 192, such as proximate to the front end 188. The gasket interface 196 is configured to engage the gasket spring fingers of the EMI gasket 128 of the receptacle assembly 104. The gasket interface 196 is provided at the top 192. The gasket interface 196 may be generally planar and may extend between the sides 184, 186. Optionally, the gasket interface 196 may include bumps or protrusions for interfacing the with the EMI gasket 128. Optionally, the landing cover 180 may include a heat sink interface for engaging a thermal interface of a heatsink of the receptacle assembly 104. For example, the top 192 may define the heat sink interface.

In an exemplary embodiment, the landing cover 180 spans the entire cooling channel 164 between the channel walls 160, 162 to provide electrical shielding across the cooling channel 164. The gaps 172 allow airflow through the cooling channel 164, while the heat transfer fins 170 and the landing cover 180 block the EMI. The gaps 172 are sized to block EMI while allowing significant airflow through the upper shell 140.

Figure 6:
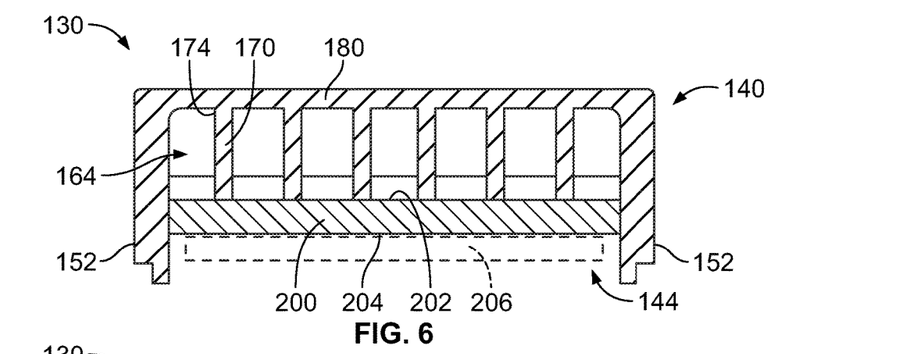
FIG. 6 is a cross-sectional view of the upper shell in accordance with an exemplary embodiment.

FIG. 6 is a cross-sectional view of the upper shell 140 of the pluggable body 130 in accordance with an exemplary embodiment. FIG. 6 illustrates a heat spreader plate 200 of the upper shell 140. In the illustrated embodiment, the heat spreader plate 200 is a separate and discrete component from the upper shell 140 positioned between the side walls 152. The heat spreader plate 200 may be secured in the cavity 144, such as using adhesive, welding, mechanical fasteners, an interference fit, or other means. In other various embodiments, the heat spreader plate 200 is part of the integral unitary structure of the upper shell 140. For example, the heat spreader plate 200 may be integral with the side walls 152 and the heat transfer fins 170.

The heat spreader plate 200 includes an upper surface 202 and a lower surface 204. The upper surface 202 is positioned below the cooling channel 164. The heat transfer fins 170 engage the upper surface 202 such that the heat spreader plate 200 is thermally coupled to the heat transfer fins 170. The heat transfer fins 170 extend between the landing cover 180 and the heat spreader plate 200. The heat transfer fins 170 are integral with the landing cover 180 and the bases 174 of the heat transfer fins 170 are configured to directly engage the heat spreader plate 200. The lower surface 204 is configured to engage a communication component 206 (shown in phantom). The heat spreader plate 200 dissipates heat from the communication component 206 into the upper shell 140, such as into the heat transfer fins 170.

In the illustrated embodiment, the heat spreader plate 200 is a thermally conductive elastomeric pad. The heat spreader plate 200 may be compressible. The heat spreader plate 200 is manufactured from a material having high thermal conductivity.

Figure 7:
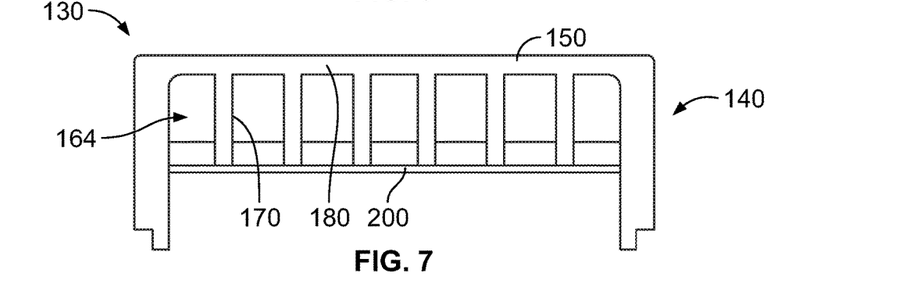
FIG. 7 is a cross-sectional view of the upper shell in accordance with an exemplary embodiment.

FIG. 7 is a cross-sectional view of the upper shell 140 of the pluggable body 130 in accordance with an exemplary embodiment. FIG. 7 illustrates the heat spreader plate 200 in the upper shell 140. In the illustrated embodiment, the heat spreader plate 200 is a sheet metal plate arranged at the bottom of the upper wall 150. The sheet metal plate directly engages the heat transfer fins 170. The heat transfer fins 170 are located between the heat spreader plate 200 and the landing cover 180. The sheet metal plate is thinner than the elastomeric pad shown in FIG. 6, allowing the heat transfer fins 170 to be longer to increase the amount of airflow through the cooling channel 164 and/or allow taller communication components in the cavity 144.

Figure 8:
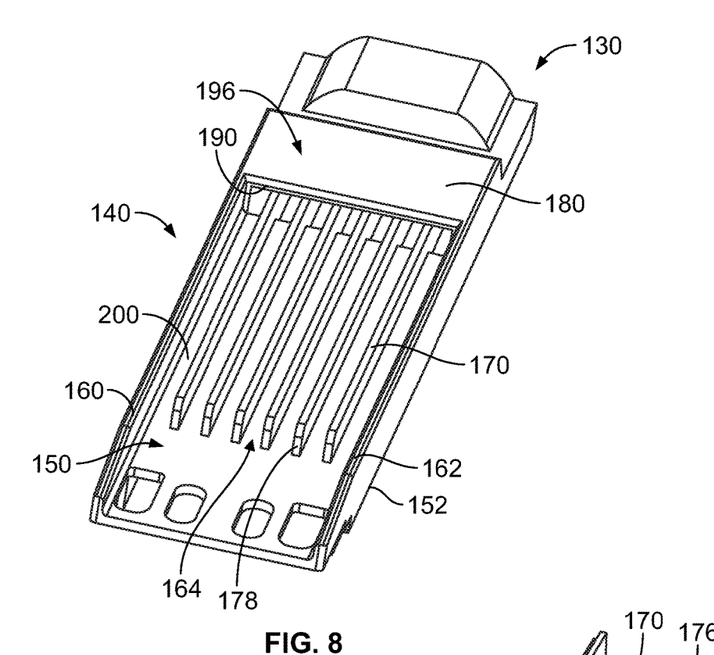
FIG. 8 is a top perspective view of a portion of the upper shell in accordance with an exemplary embodiment.
Figure 9:
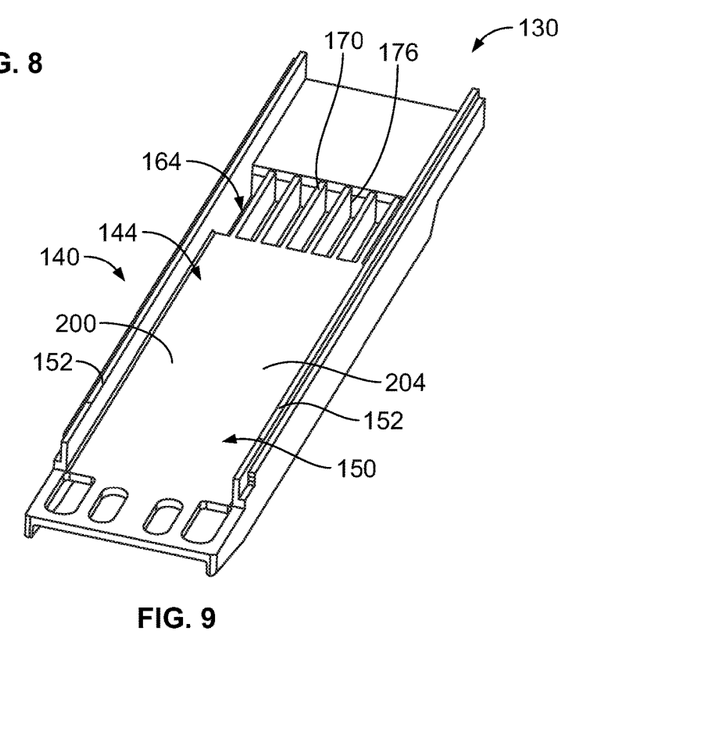
FIG. 9 is a bottom perspective view of the upper shell in accordance with an exemplary embodiment.

FIG. 8 is a top perspective view of a portion of the pluggable body 130 showing the upper shell 140 in accordance with an exemplary embodiment. FIG. 9 is a bottom perspective view of a portion of the pluggable body 130 showing the upper shell 140 in accordance with an exemplary embodiment. In the illustrated embodiment, the upper shell 140 includes the heat spreader plate 200 as part of the integral unitary structure of the upper wall 150. The heat spreader plate 200 is integral with the side walls 152, the heat transfer fins 170 and the landing cover 180. In the illustrated embodiment, the landing cover 180 is shorter than other illustrated embodiments, such as only including the gasket interface 196.

The upper wall 150 has the channel walls 160, 162 defining the cooling channel 164. The landing cover 180 is provided above the cooling channel 164 and the heat spreader plate 200 is provided below the cooling channel 164. In an exemplary embodiment, portions of the heat transfer fins 170 are uncovered. For example, the rear ends 178 of the heat transfer fins 170 are uncovered. The landing cover 180 only covers the front ends 176 and corresponding portions of the heat transfer fins 170. The upper wall 150 is open above the rear ends 178 of the heat transfer fins 170.

In an exemplary embodiment, the heat spreader plate 200 is open below the landing cover 180. For example, the landing cover 180 does not extend over the heat spreader plate 200, but rather the heat spreader plate 200 ends at the rear end 190 of the landing cover 180 with the heat transfer fins 170 extending forward of the heat spreader plate 200 under the landing cover 180. Optionally, such arrangement may increase airflow into the interior of the pluggable module 106. Such arrangement of the heat spreader plate 200 and the landing cover 180 may allow for die casting of the upper shell 140, such as for forming the heat transfer fins 170 using dies from above and below where appropriate.

In an exemplary embodiment, the lower surface 204 of the heat spreader plate 200 is generally planar and configured to be thermally coupled to the communication component 206. The side walls 152 extend below the heat spreader plate 200 to form the cavity 144 of the pluggable module 106. Optionally, an intermediary thermal component may be provided between the communication component 206 and the heat spreader plate 200. For example, a thermally conductive elastomeric pad may be received in the cavity 144 below the heat spreader plate 200.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A pluggable module comprising:
a pluggable body extending between a front end and a mating end, the mating end being receivable in a module cavity of a receptacle assembly to mate with a communication connector, the pluggable body having channel walls defining a cooling channel at a top of the pluggable body, the cooling channel allowing airflow between the front end and the mating end, the pluggable body having a plurality of heat transfer fins in the cooling channel between the channel walls, the pluggable body having a landing cover spanning between the channel walls over the heat transfer fins, wherein the channel walls, the heat transfer fins and the landing cover are an integral unitary structure; and
a communication circuit board held in the pluggable body and exposed at the mating end, wherein the pluggable body is configured to be plugged into the receptacle assembly such that the communication circuit board is communicatively coupled to the communication connector of the receptacle assembly.

2. The pluggable module of claim 1, wherein the heat transfer fins are internal heat transfer fins interior of the landing cover.

3. The pluggable module of claim 1, wherein the top of the pluggable body is recessed at the front end and at the mating end to expose the heat transfer fins and allow airflow through the cooling channel between the front end and the mating end.

4. The pluggable module of claim 1, wherein the cooling channel is open at bases of the heat transfer fins.

5. The pluggable module of claim 1, wherein the channel walls are at least one of taller and thicker than the heat transfer fins.

6. The pluggable module of claim 1, wherein the heat transfer fins extend longitudinally between the front end and the mating end parallel to the channel walls.

7. The pluggable module of claim 1, wherein each heat transfer fin includes a base and a tip, the landing cover at the tip, the base being thermally coupled to a heat spreader plate.

8. The pluggable module of claim 1, further comprising a heat spreader plate spanning below the heat transfer fins, the heat spreader plate being configured to be thermally coupled to a communication component on the communication circuit board.

9. The pluggable module of claim 8, wherein the heat spreader plate is a sheet metal plate received in the pluggable body.

10. The pluggable module of claim 8, wherein the heat spreader plate is a thermally conductive elastomeric pad received in the pluggable body.

11. The pluggable module of claim 1, wherein the pluggable body includes side walls below the channel walls, the communication circuit board being positioned between the side walls, the pluggable module further comprising a heat spreader plate between the side walls below the heat transfer fins.

12. The pluggable module of claim 11, wherein the heat spreader plate is part of the integral unitary structure of the channel walls, the heat transfer fins and the landing cover.

13. The pluggable module of claim 1, wherein the pluggable body includes side walls below the channel walls, the communication circuit board being positioned between the side walls, the side walls being part of the integral unitary structure of the channel walls, the heat transfer fins and the landing cover.

14. The pluggable module of claim 1, wherein the landing cover spans an entire longitudinal length of the heat transfer fins.

15. The pluggable module of claim 1, wherein the landing cover extends between a front end and a rear end, the heat transfer fins extending to the front end of the landing cover, the heat transfer fins extending rearward beyond the rear end of the landing cover such that portions of the heat transfer fins are uncovered by the landing cover.

16. The pluggable module of claim 1, wherein the landing cover includes a planar landing surface configured to engage the receptacle assembly.

17. The pluggable module of claim 16, wherein the planar landing surface includes a gasket interface configured to engage gasket spring fingers of an EMI gasket of the receptacle assembly.

18. The pluggable module of claim 16, wherein the planar landing surface includes a heat sink interface configured to engage a thermal interface of a heatsink of the receptacle assembly.

19. The pluggable module of claim 1, wherein the channel walls, the heat transfer fins and the landing cover are integral being devoid of thermal interfaces therebetween.

20. A pluggable module comprising:
a pluggable body comprising an upper shell and a lower shell, the lower shell having a lower wall and lower side walls and the upper shell having an upper wall and upper side walls, the lower wall, the upper wall, the lower side walls and the upper side walls forming a cavity, the pluggable body extending between a front end and a mating end, the mating end being receivable in a module cavity of a receptacle assembly to mate with a communication connector,
the upper wall having a cooling channel allowing airflow between the front end and the mating end, the upper wall having a plurality of heat transfer fins in the cooling channel, the upper wall having a landing cover at a top of the upper shell spanning over the heat transfer fins;
the upper shell having a heat spreader plate at the upper wall between the upper side walls, the heat spreader plate closing the cooling channel below the heat transfer fins; and
a communication circuit board held in the pluggable body and exposed at the mating end, the communication circuit board having a communication component in thermal contact with the heat spreader plate, wherein the pluggable body is configured to be plugged into the receptacle assembly such that the communication circuit board is communicatively coupled to the communication connector of the receptacle assembly.

21. A pluggable module comprising:
a pluggable body comprising an upper shell and a lower shell, the lower shell having a lower wall and lower side walls and the upper shell having an upper wall and upper side walls, the lower wall, the upper wall, the lower side walls and the upper side walls forming a cavity, the pluggable body extending between a front end and a mating end, the mating end being receivable in a module cavity of a receptacle assembly to mate with a communication connector,
the upper wall having a cooling channel allowing airflow between the front end and the mating end, the upper wall having a plurality of heat transfer fins in the cooling channel extending longitudinally between front ends and rear ends, the upper wall having a landing cover at a top of the upper wall spanning over the front ends of the heat transfer fins, the upper shell having a heat spreader plate at a bottom of the upper wall spanning below the rear ends of the heat transfer fins, wherein the landing cover and the heat spreader plate are longitudinally offset; and
a communication circuit board held in the pluggable body and exposed at the mating end, the communication circuit board having a communication component in thermal contact with the heat spreader plate, wherein the pluggable body is configured to be plugged into the receptacle assembly such that the communication circuit board is communicatively coupled to the communication connector of the receptacle assembly.

22. The pluggable module of claim 21, wherein the upper wall is open above the rear ends of the heat transfer fins and the heat spread plate and wherein the upper wall is open below the front ends of the heat transfer fins and the landing cover.

* * * * *